United States Patent [19]
Ido et al.

[11] Patent Number: 5,629,833
[45] Date of Patent: May 13, 1997

[54] PANEL UNIT SWING MECHANISM HAVING FIRST AND SECOND GUIDE GROOVES AND FIRST AND SECOND CONNECTING MEMBERS

[75] Inventors: Yukinori Ido, Tokyo; Hiroaki Hishiyama, Tachikawa; Haruki Ota, Yokohama, all of Japan

[73] Assignee: Casio Computer Co., Ltd., Tokyo, Japan

[21] Appl. No.: 511,886

[22] Filed: Aug. 7, 1995

[30] Foreign Application Priority Data

Aug. 22, 1994 [JP] Japan ................... 6-218313

[51] Int. Cl.⁶ ................ G06F 1/16; H05K 7/16
[52] U.S. Cl. ............... 361/681; 248/919; 248/922
[58] Field of Search ............. 312/223.2; 345/168, 345/905; 248/917–923, 287.1; 364/708.1; 361/680–683, 686

[56] References Cited

U.S. PATENT DOCUMENTS

| | | |
|---|---|---|
| 4,408,835 | 10/1983 | Deprez et al. . |
| 4,901,973 | 2/1990 | Ferrara, Jr. . |
| 5,134,390 | 7/1992 | Kishimoto et al. ............ 248/917 X |
| 5,329,289 | 7/1994 | Sakamoto et al. ............ 248/922 X |

FOREIGN PATENT DOCUMENTS

| | | |
|---|---|---|
| 0055662 | 7/1982 | European Pat. Off. . |
| 4-58725 | 5/1992 | Japan . |

*Primary Examiner*—Michael W. Phillips
*Attorney, Agent, or Firm*—Frishauf, Holtz, Goodman, Langer & Chick

[57] ABSTRACT

A mechanism for swinging a rectangular plate-like panel unit between a first state in which the panel unit is set with its longer sides parallel to a horizontal direction and a second state in which the panel unit is set with its shorter sides parallel to the horizontal direction. The mechanism includes a support unit swingably supporting the panel unit, a first connecting member coupling the panel unit and the support unit, and a second connecting member coupling the panel unit and the support unit. The first connecting member serves as a shaft around which the panel unit is swingable relative to the support unit. The mechanism further includes a first guide groove formed in the support unit to regulate movement of the first connecting member, and a second guide groove formed in the support unit to regulate movement of the second connecting member. The first and second connecting members respectively engage the first and second guide groove and are respectively movable therein when the panel unit is swung between the first and second states.

20 Claims, 11 Drawing Sheets

PANEL UNIT SWING MECHANISM HAVING FIRST AND SECOND GUIDE GROOVES AND FIRST AND SECOND CONNECTING MEMBERS

Background of the Invention

1. Field of the Invention

The present invention relates to a mechanism for swinging a panel unit of personal information units such as personal computers and word processors.

2. Description of the Related Art

Information units such as personal computers have been made smaller and smaller and those of lap-top and notebook types having superior portability have been developed.

In the case of the information units of these types, a key input section is arranged in the top of a unit case, a display case is swingably attached to the unit case to freely close the key input section, and a display section is arranged in that face of the display case which is opposed to the key input section.

In these information units, the key input section is made longer in the horizontal direction, considering the arrangement of keys at the key input section. Therefore, the display case which covers the key input section is also made longer in the horizontal direction and the display section is thus made longer in the same direction. When the display case is swung and erected relative to the unit case, therefore, the display section is always kept longer in the horizontal direction. Such display section is suitable for drawing figures and the like. In a case where documents are created, however, many characters can be inputted in a single line but the number of lines is limited. This often makes it difficult to use the information unit as desired. This is a common undesirable drawback of conventional information units.

In order to solve this drawback, therefore, information units capable of changing their display section between horizontal and vertical states have been discussed and proposed. The applicant of this patent application has filed Jpn. UM Appln. KOKAI Publication No. Hei 4-58725. A small-sized data process unit which has been disclosed as an example of these information units in the above referenced UM application includes a support attached to a unit body (which serves as a body case) by hinges and a cover (which serves as the display case) freely swingably attached to the support through a cylindrical connecting member (hereinafter also referred to as a) swing shaft. More specifically, the swing shaft is erected from the rear face of the cover at an upper left position, nearer to the center, thereof, its front portion is inserted into a slot formed, parallel to a shaft of the hinges, in the support at an upper left position thereof, and a flange at its front portion is contacted with a part of the rim of the slot, so that the cover can be freely swingably connected to the support. Further, the swing shaft includes a swing regulating projection arranged at a part of it and detachably engageable with engaging recesses at both ends of the slot. The case which is under horizontal state and also under vertical state can be thus regulated in position by the projection of the swing shaft not to freely move in the slot.

In this small-sized data process unit, however, the slot in the support is formed substantially parallel to the shaft of the hinges and one swing shaft is swingably and movably fitted into the slot. When the cover or display case is swung from horizontal to vertical state, therefore, a lower corner of the cover is projected to a great extent toward the device body or body case. In order to prevent the lower corner of the cover from being struck against the top of the device body in this case, the angle by which the cover is swung relative to the device body must be made larger than about 150°, for example. This makes it troublesome to use the information device. Further, the cover is swung round one swing shaft in the information device. When the cover is to be swung to the horizontal or vertical state, therefore, its swing must be regulated by a swing regulating means. In order to provide this swing regulating means, a swing regulating projection must be arranged on the swing shaft and engaging recesses must be formed in the slot. This makes the swing shaft and the slot complicated in structure and troublesome to manufacture.

SUMMARY OF THE INVENTION

The object of the present invention is therefore to provide a panel unit swing mechanism capable of more easily swinging a panel unit from horizontal to vertical state and vice versa.

According to the present invention, this object can be achieved by a mechanism for swinging a rectangular plate-like panel unit, which is swingably supported by a support unit, between a first state in which the panel unit is set with its longer sides parallel to a horizontal direction and a second state in which the panel unit is set with its shorter sides parallel to the horizontal direction. The present invention comprises a first connecting member arranged at a certain position of the panel unit to serve as a center shaft round which the panel unit is swung relative to the support unit; a second connecting member arranged in the panel unit and positioned between a lower left corner of the panel unit and the first connecting member when the panel unit is in the first and second states; a first groove formed in the support unit under the first connecting member to regulate the movement of the second connecting member when the panel unit is swung from the first state to the second state and vice versa; and a second guide groove formed in the support unit to regulate movement of the first connecting member up and down as the second connecting member moves along the first guide groove when the panel unit is swung from the first state to the second state and vice versa.

According to the present invention, therefore, the panel unit can be swung to either of horizontal or vertical states, and when it is swung, its lower corner is not projected downward to a great extent. In addition, the panel unit can be swung stably and smoothly with a small force.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIGS. 1 through 11 show embodiments of the present invention, in which:

DETAILED DESCRIPTION OF THE PREFERRED EMBODIMENT

Referring to FIGS. 1 through 9, the panel unit swing mechanism according to a first embodiment of the present invention will be described.

Figure 1:
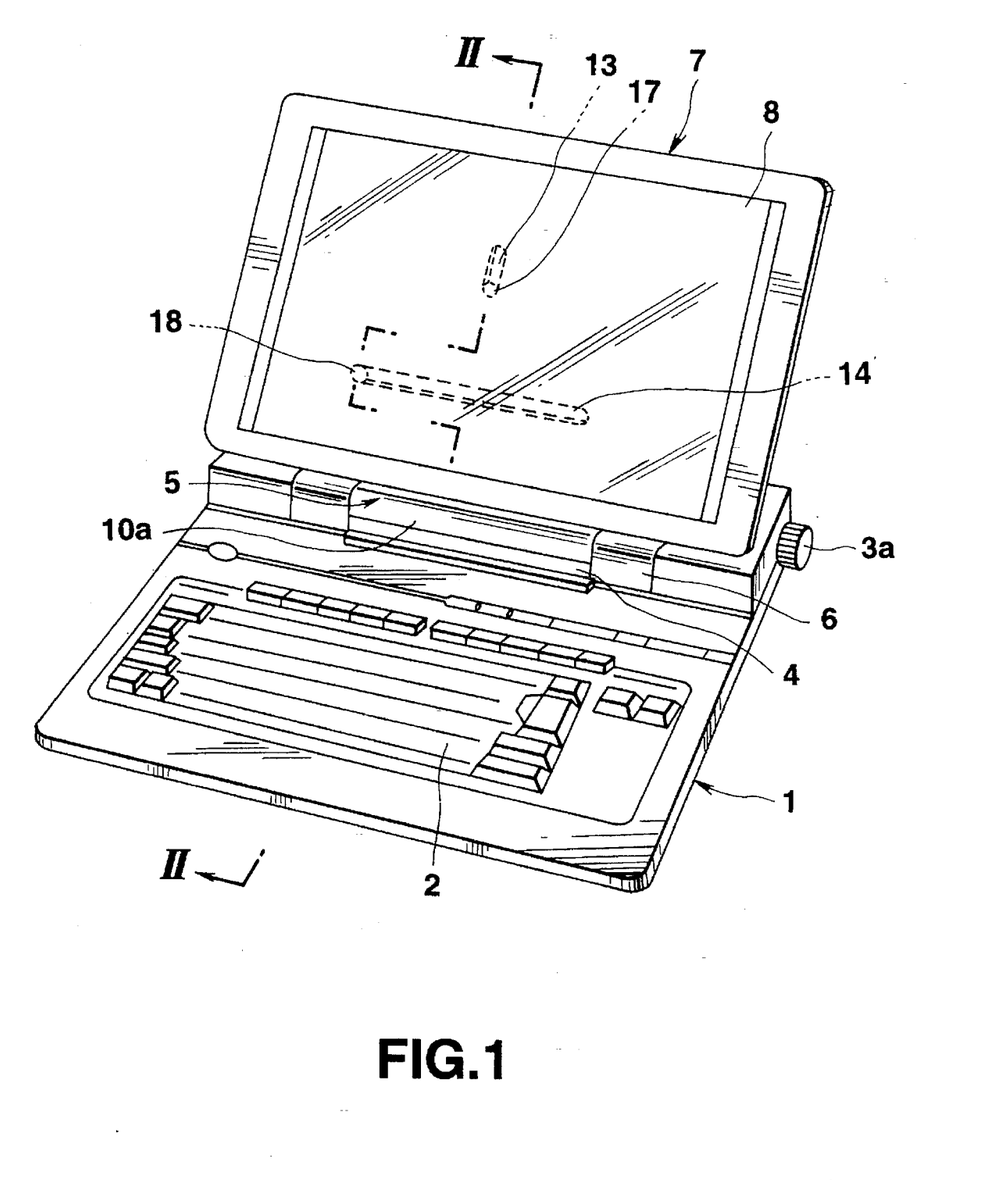
FIG. 1 is a perspective view showing the panel unit swing mechanism according to a first embodiment of the present invention by which longer sides of a display case are set parallel to the horizontal direction.
Figure 2:
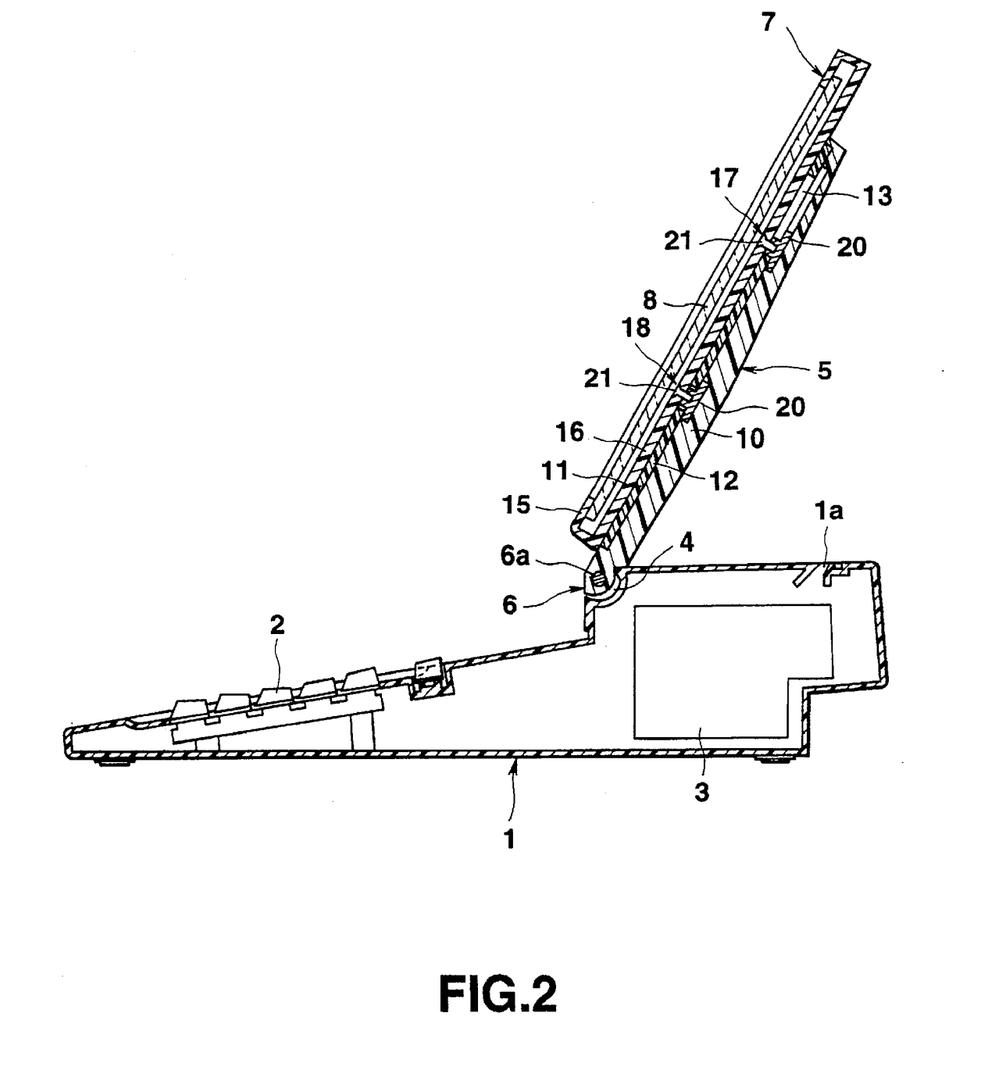
FIG. 2 is a sectional view taken along a line II—II in FIG. 1.
Figure 3:
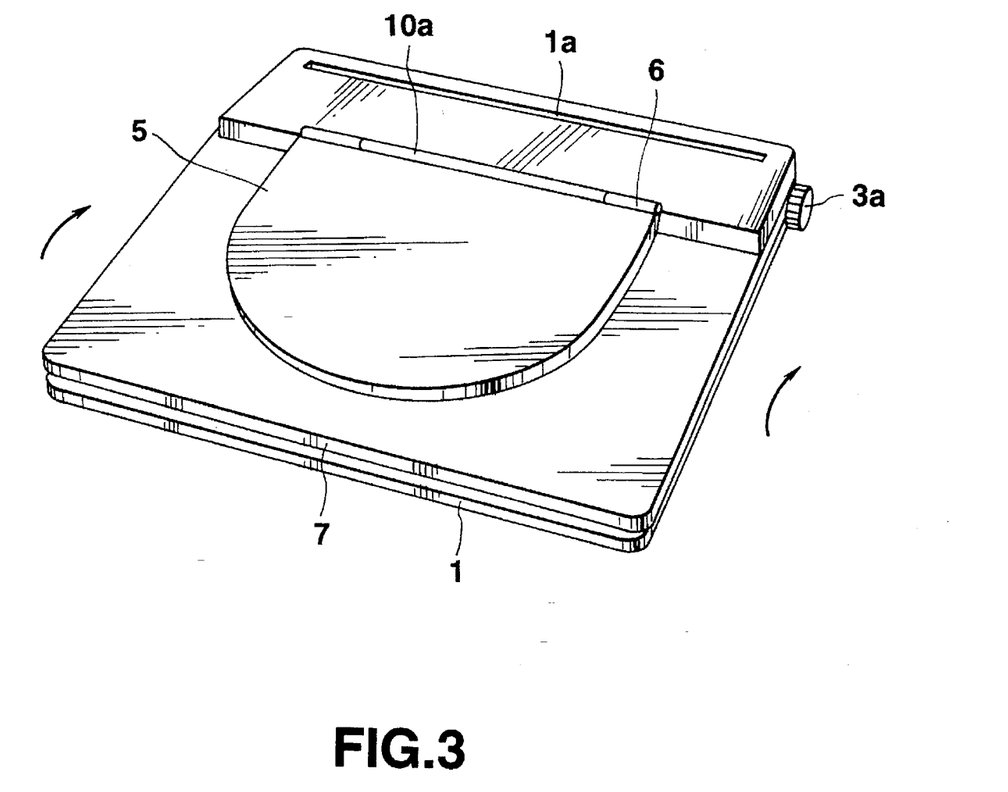
FIG. 3 is a perspective view showing the display case closed onto a body case.

In FIGS. 1 through 3, reference numeral 1 denotes a body case. It is shaped like a box, having a lower front portion and a higher rear portion. It has a key input section 2, which comprises various keys, at its lower front portion while it houses a printer 3 in its higher rear portion, as shown in FIG. 2. It also has a slit 1a, through which sheets of recording paper are discharged, in the top of its higher rear portion and a recording paper feeding knob 3a on a side thereof, as shown in FIG. 3. It also has an arc recess 4 formed on a portion which rises from the rear end of its lower front portion, and a support unit 5 is freely swingably attached to the recess 4 by hinges 6, as shown in FIG. 2. A display case 7 which closes the key input section 2 of the body case 1 is attached, as will be described later, to the support unit 5. A panel-like display section 8 such as the liquid crystal display is arranged in the display case 7, facing the top of the body case 1. In the case of this information device, therefore, desired data can be inputted through the key input section 2 and the data thus inputted can be displayed on the display section 8 and printed on the recording paper by the printer 3.

Figure 4:
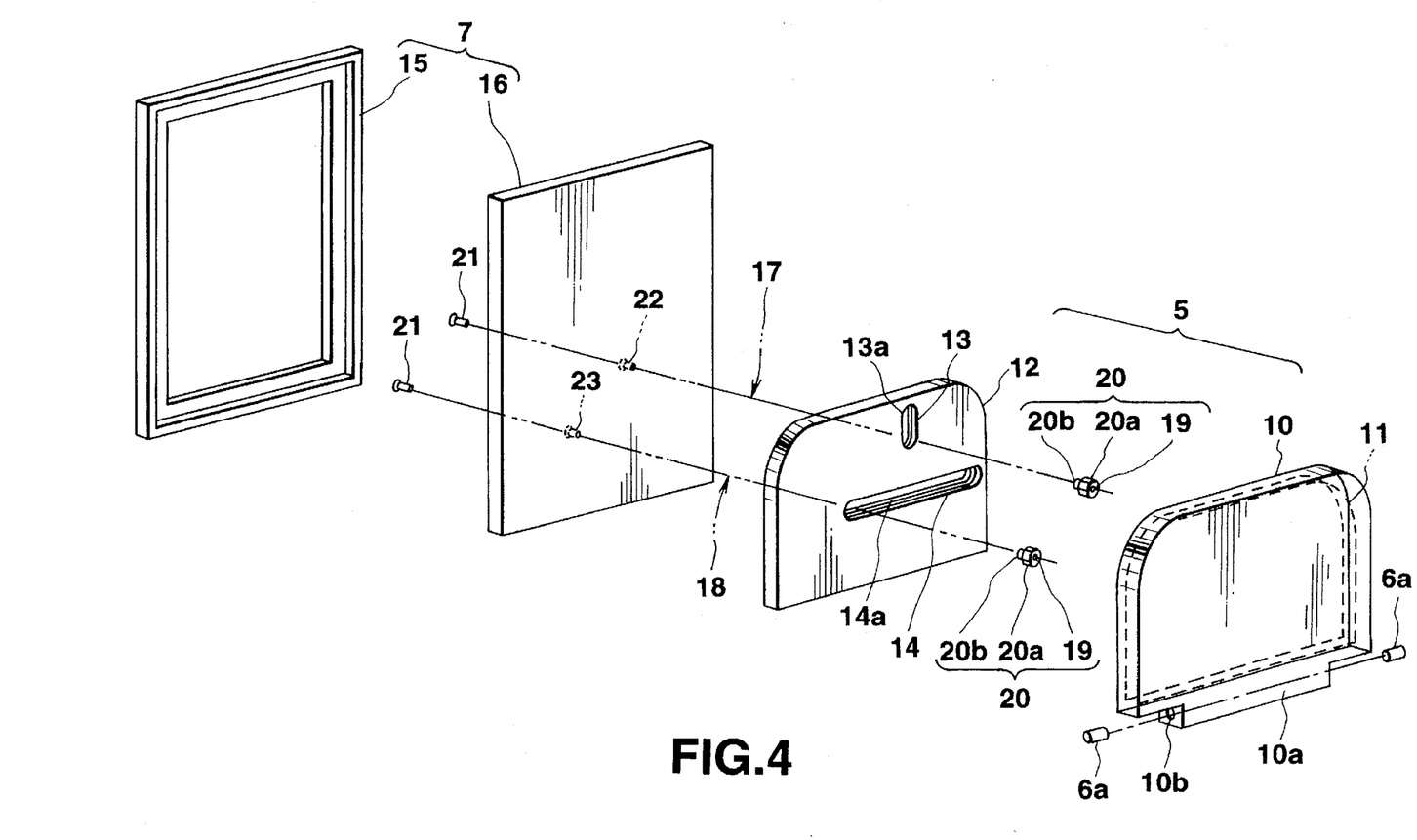
FIG. 4 is a perspective view showing a support unit and the display case dismantled.

The display case 7 is attached to the support unit 5, as shown in FIG. 4. The support unit 5 includes a substantially semicircular support plate 10 and an attaching plate 12 attached to a recess 11 in a face of the support plate 10 by screws. A first guide groove 13 is formed in the attaching plate 12 at an upper and right hand position thereof, extending in the vertical direction perpendicular to a shaft of the hinges 6. A second guide groove 14 is also formed in the attaching plate 12 at a right hand position and under the first guide groove 13 thereof, extending in the horizontal direction parallel to the shaft of the hinges 6. These first and second guide grooves 13 and 14 have collars 13a and 14a each being formed along that rim portion of the groove which is on the side of the display case 7. The display case 7 comprises a front case 15 in which the display section 8 is arranged, and a rear case 16 attached to the front case 15 by screws. First and second connecting members 17 and 18 are arranged in the rear case 16 at those positions thereof which correspond to the first and second guide grooves 13 and 14.

The first connecting member (or rotation shaft) 17 includes a slide rotor 20 having a screw hole 19 along its center line, and an attaching screw 21 screwed into the screw hole 19 of the slide rotor 20. The attaching screw 21 is screwed into the screw hole 19 of the slide rotor 20 passing through a hole 22 in the rear case 16 such that; (i) a larger-diameter portion 20a of the slide rotor 20 is freely movably arranged in the first guide groove 13, (ii) a smaller-diameter portion 20b thereof is projected toward the rear case 16 through the collar 13a, and (iii) a stepped portion of the slide rotor 20 between the larger 20a and the smaller-diameter portion 20b thereof is contacted with the collar 13a. When the display case 7 is set with its longer sides parallel to the vertical direction, the first connecting member 17 is in the rear case 16 below the center and at right hand position thereof, as shown in FIG. 4.

The second connecting (or guide) member 18 includes a slide rotor 20 and an attaching screw 21 similar to that of the first connecting member 17. The attaching screw 21 is screwed into a screw hole 19 in the slide rotor 20 passing through a hole 23 in the rear case 16 such that: (i) a larger-diameter portion 20a of the slide rotor 20 is freely movably arranged in the second guide groove 14, (ii) a smaller-diameter portion 20b thereof is projected toward the rear case 16 through the collar 14a, and (iii) a stepped portion of the slide rotor 20 between the larger 20a and the smaller-diameter portion 20b thereof is contacted with the collar 14a. When the display case 7 is set with its longer sides parallel to the vertical direction, the second connecting member 18 is substantially in the center on a line extending from the hole 22 in the rear case 16 to a lower left corner 16a of the case 16.

Therefore, the attaching plate 10 of the support unit 5 and the rear case 16 of the display case 7 are attached to each other by first and second connecting members 17 and 18 in such a way that the rear case 16 can be swung relative to the attaching plate 10 by 90°.

Figure 5:
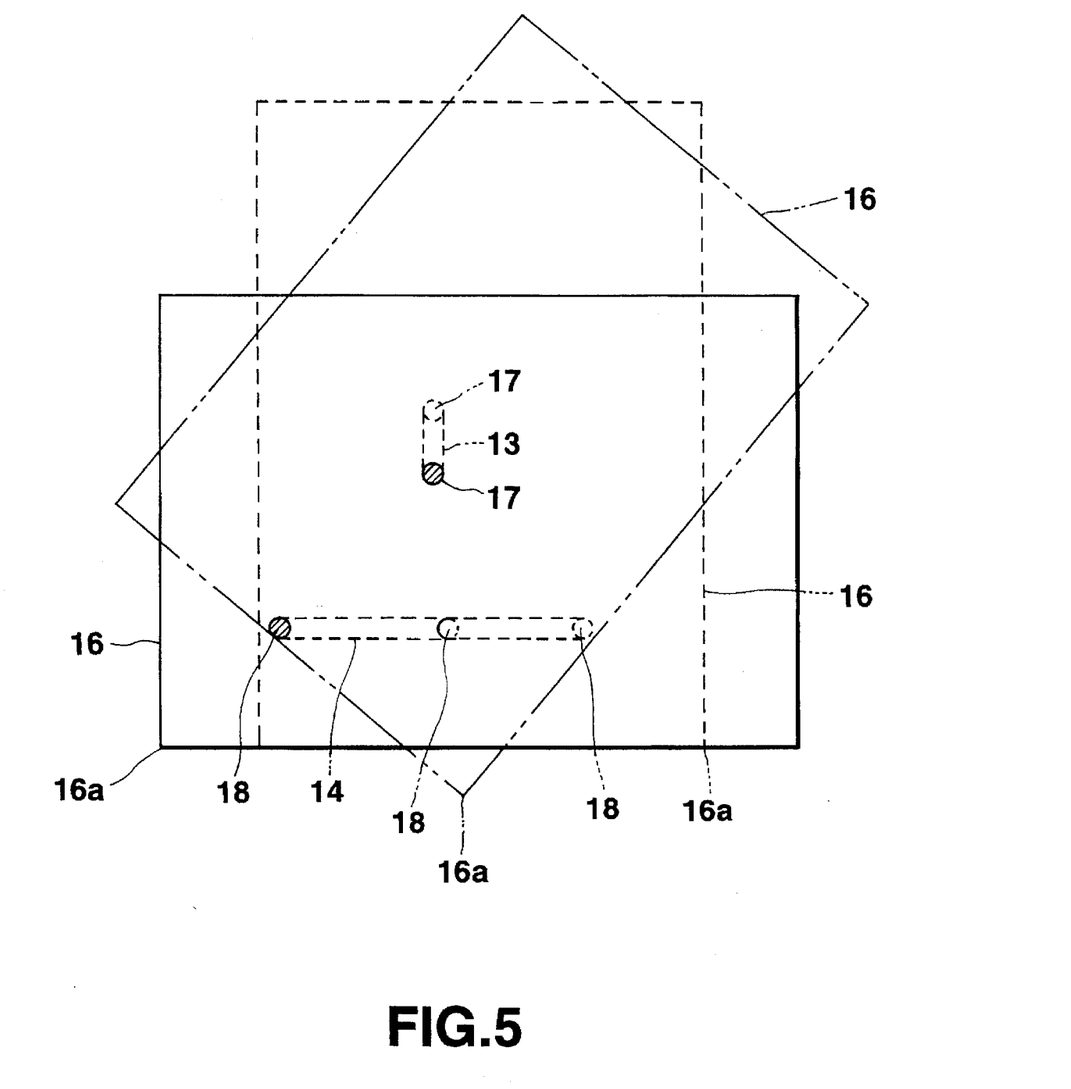
FIG. 5 shows how first and second guide grooves and first and second connecting members are related to the body case when the display case is swung.
Figure 6:
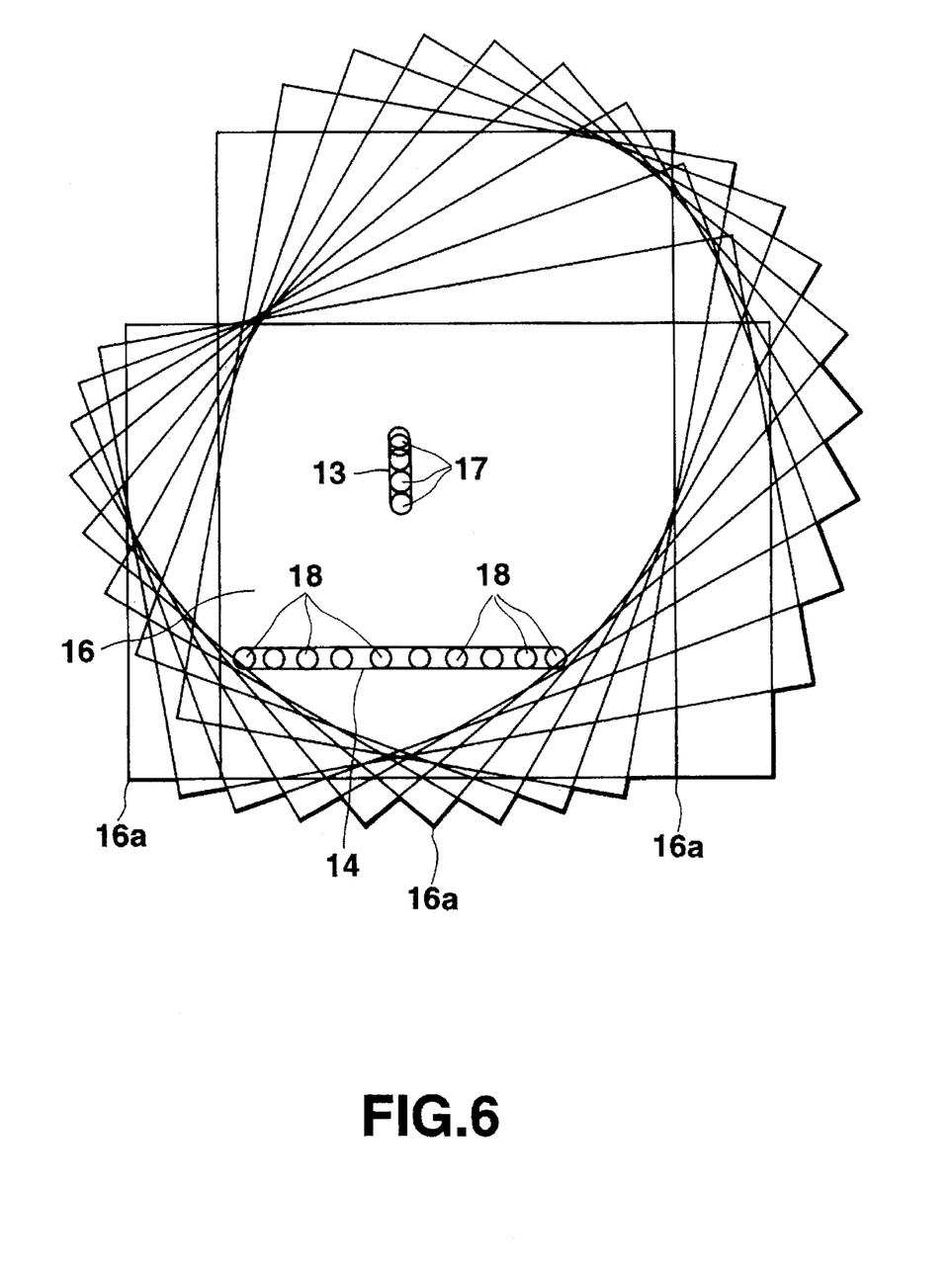
FIG. 6 shows a moving track that a rear case draws when the display case is swung in FIG. 5.

As shown in FIGS. 5 and 6, the first and second guide grooves 13 and 14 operate together with the first and second connecting members 17 and 18 to swing the display case 7 relative to the support unit 5 by 90°. FIGS. 5 and 6 show views of the support unit 5 from the side of the rear case 16, reverse to the view in FIG. 4. When the rear case 16 is set with its longer sides parallel to the horizontal direction, as shown by a solid line in FIG. 5, the second connecting member 18 is located at the left side end of the second guide groove 14. When it is set with its longer sides parallel to the vertical direction, as shown by a broken line in FIG. 5, the second connecting member 18 is positioned at the right side end of the second guide groove 14. The second guide groove 14 has a linear length so as to enable the second connecting member 18 to be positioned at these points. Further, the first guide groove 13 is formed to have such a linear length so that: (i) the first connecting member 17 can be located at the lowest position in the groove 13 when the rear case 16 is set with its longer sides parallel to the horizontal direction and also parallel to the vertical direction, as shown by solid and broken lines in FIG. 5, and (ii) the first connecting member 17, can be located at the top of the groove 13 when the case 16 is in the process of being swung, as shown by a two-dot and dash line in FIG. 5. When the rear case 16 is swung relative to the attaching plate 10 of the support unit 5 by 90°, therefore, the lower left corner 16a of the rear case 16 draws a moving track as shown in FIG. 6.

The support unit 5 can be swingably attached to the body case 1 by hinges 6 as follows: A protrusion 10a projected from the lower end of the support plate 10 is arranged in the recess 4 of the body case 1 and shaft pins 6a attached to both end faces of the recess 4 are fitted into shaft holes 10b in both end faces of the protrusion 10a.

Electric connection between the body case 1 and the display case 7 can be attained in such a way that a signal line, for example, is guided from the body case 1 into the support unit 5 through the hinge 6 then into the display case 7, passing through that portion of the support unit 5 which is adjacent to the first connecting member 17 and which is swung to a lesser degree.

In the case of this information device, switches (not shown) are arranged at both ends of the second guide groove 14 and when they are switched on and off by the second connecting member 18, the display section 8 is changed over from a horizontal display mode to a vertical one and vice versa.

In the case of this information device, the support unit 5 is swung round the hinges 6 to open and erect the display case which in its closed state encloses the key input section 2 of the body case 1 relative to the body case 1 by a certain angle (about 100°–120° in this case). The display case 7 is thus erected with its longer sides parallel to the horizontal direction, as shown in FIG. 1. The display section 8 is therefore set with its longer sides parallel to the horizontal direction. The key input section 2 in the top of the body case 1 is thus exposed to thereby enable data to be inputted through the key input section 2. In addition, the display section 8 is set with its longer sides parallel to the horizontal direction. It is therefore quite suitable for displaying figures, tables and other similar elongated graphics. When the display case 7 is in this state, the second connecting member 18 is positioned at the left side end of the second guide groove 14. A switch is arranged to be turned on by the second connecting member 18 to thereby select the display section 8 to be in a horizontal display mode.

Figure 7:
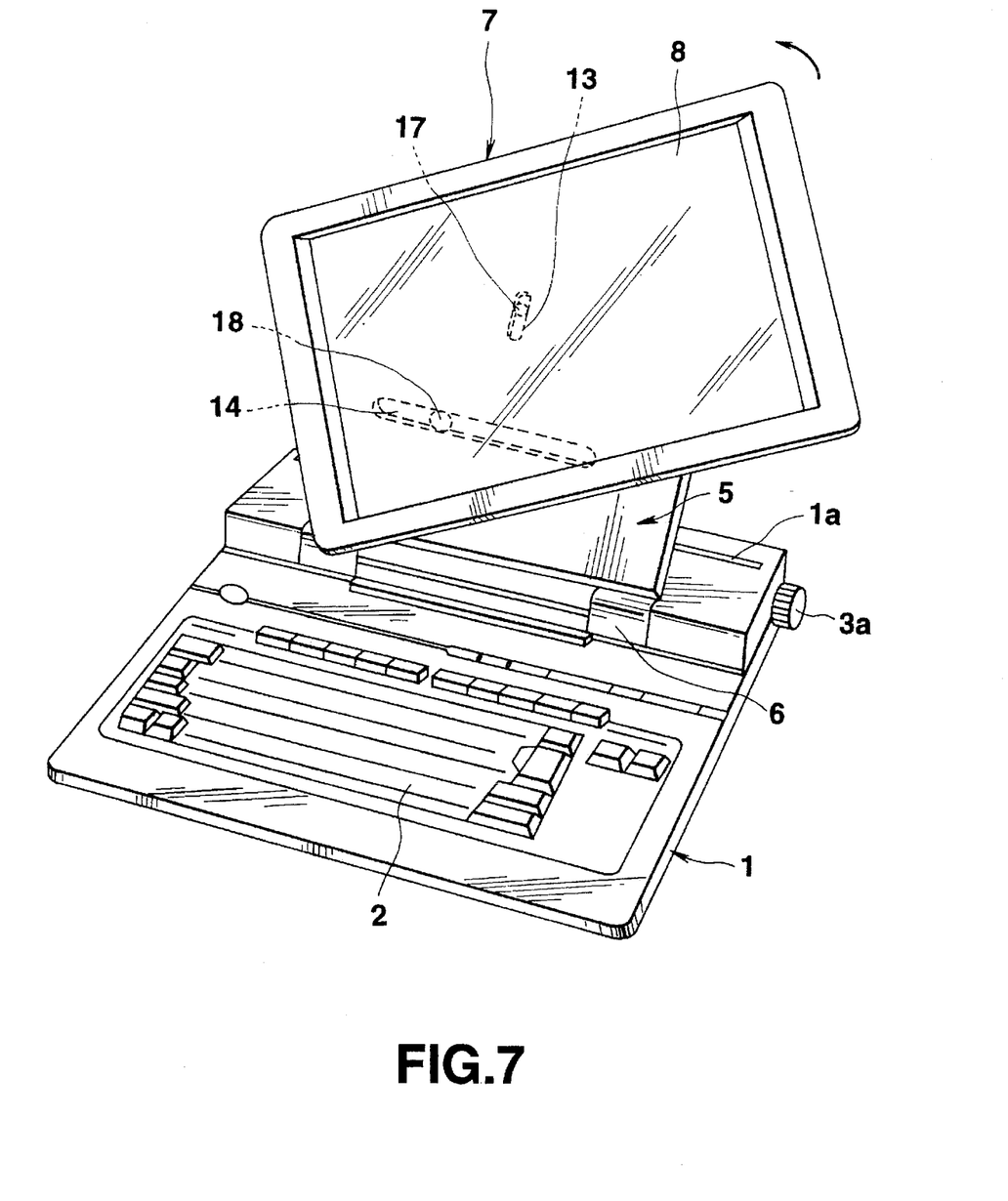
FIG. 7 is a perspective view showing the display case about to be swung counterclockwise from the state shown in FIG. 1 in which its longer sides are kept parallel to the horizontal direction.
Figure 8:
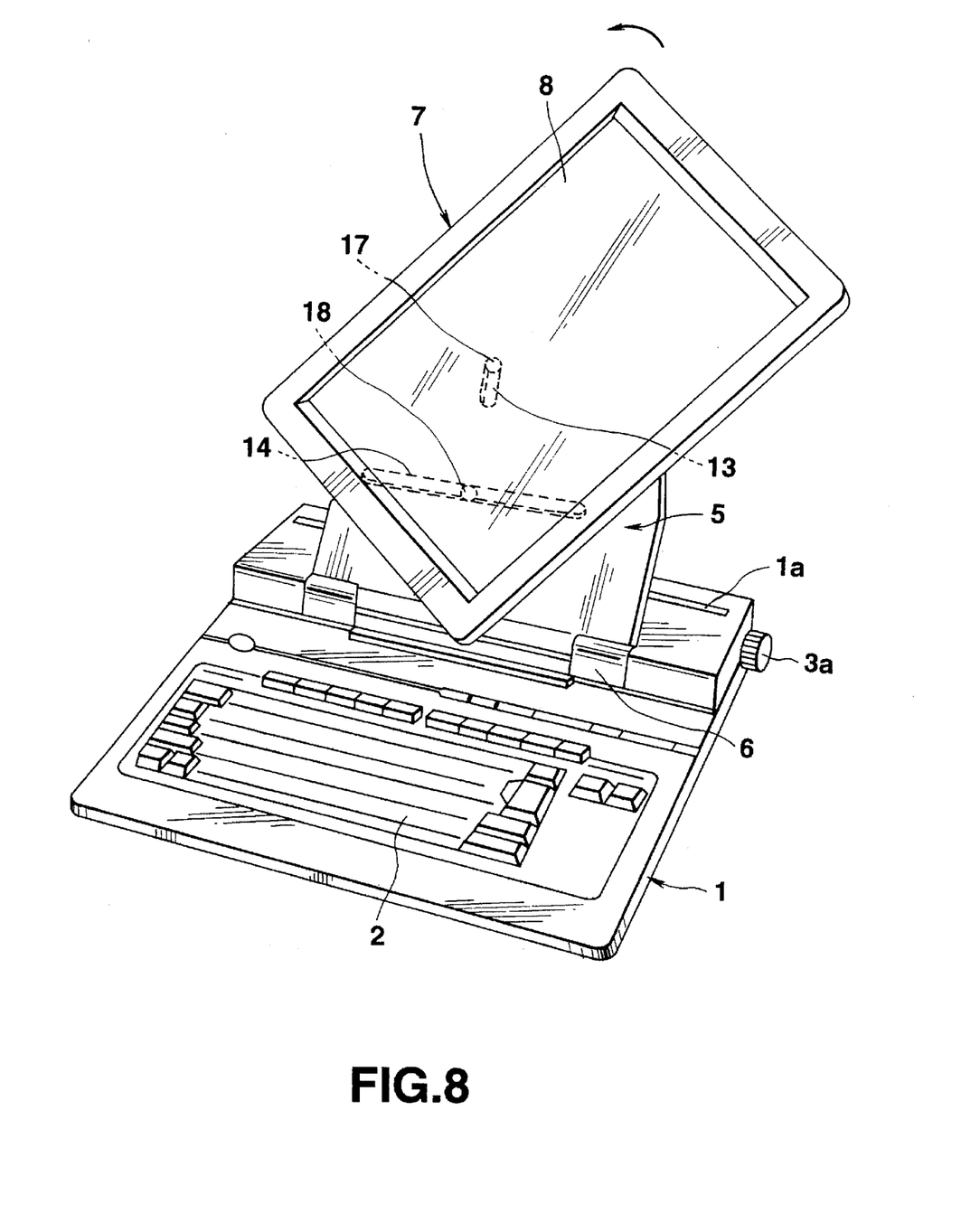
FIG. 8 is a perspective view showing the display case in the process of being set with its longer sides parallel to the vertical direction from the state shown in FIG. 1.
Figure 9:
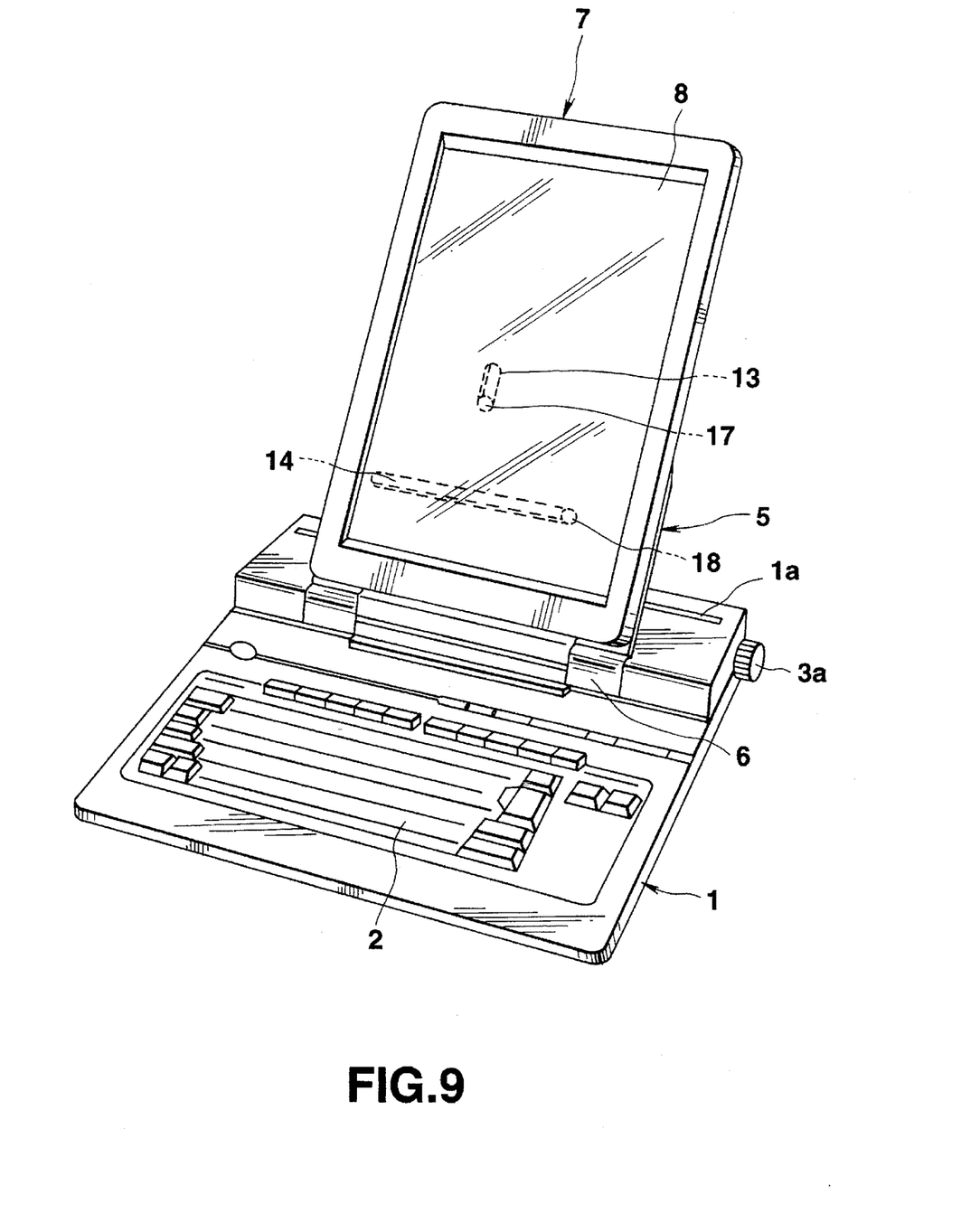
FIG. 9 is a perspective view showing the display case kept with its longer sides parallel to the vertical direction.

When the display section 8 is to be changed from the horizontal state to the vertical state, the display case 7 is swung relative to the support unit 5 in a certain direction (or counterclockwise in FIG. 1). The second connecting member 18 thus moves from the left side end rightward to right along the second guide groove 14 while the first connecting member 17 moves from the lowest position upward along the first guide groove 13, as shown in FIG. 7. When the second connecting member 18 moves to the center of the second guide groove 14, as shown in FIG. 8, the first connecting member 17 is positioned at the top of the first guide groove 13 because the second connecting member 18 comes nearest to the first guide groove 13. This enables the lower corner of the display case 7 to be projected downward to as small an extent as possible. When the second connecting member 18 then moves from the center to the right side end along the second guide groove 14, the first connecting member 17 is moved from the top downward along the first guide groove 13. When the second connecting member 18 moves from the left side end to the right side end along the second guide groove 14 in this manner, the display case 7 is swung relative to the support unit 5 by 90° and it is thus changed over from the horizontal state to the vertical state, as shown in FIG. 9. The display section 8 is set to be in a vertical state in this case. Therefore, the number characters in a line becomes fewer but the number of lines of characters in the display section 8 becomes greater. This makes the display section 8 more suitable for inputting documents and displaying them. The second connecting member 18 is positioned at the right side end of the second guide groove 14 in this state. Therefore, the switch arranged at the right side end of the second guide groove 14 is switched on by the second connecting member 18 to thereby select the display section 8 to be in the vertical display mode.

When this information unit is to be carried by hand, the display case 7 is swung in a reverse direction (or clockwise) and it is changed over from the vertical state to the horizontal state. The support unit 5 is then swung relative to the body case 1 to thereby place the display case 7 upon the body case 1, as shown in FIG. 3. When so arranged, the information device can be made more compact to be carried by hand.

When the first and second connecting members 17 and 18 move along the first and second guide grooves 13 and 14 and the second connecting member 18 comes to the center of the second guide groove 14 in this information unit, it comes nearest to the first guide groove 13. The first connecting member 17 is thus positioned at the top of the first guide groove 13. Therefore, the extent to which the lower corner of the display case 7 is projected downward can be made smaller. This makes it easier to change the display case 7 from the horizontal state to the vertical state and vice versa. When the display case 7 is in the horizontal and vertical states, the second connecting member 18 positioned at either of both side ends of the second guide groove 14 while the first connecting member 17 is positioned at the lowest portion of the first guide groove. The first and second connecting members 17 and 18 are not allowed, therefore, to freely move along the first and second guide grooves 13 and 14. This makes the display case 7 more stable.

Figure 10:
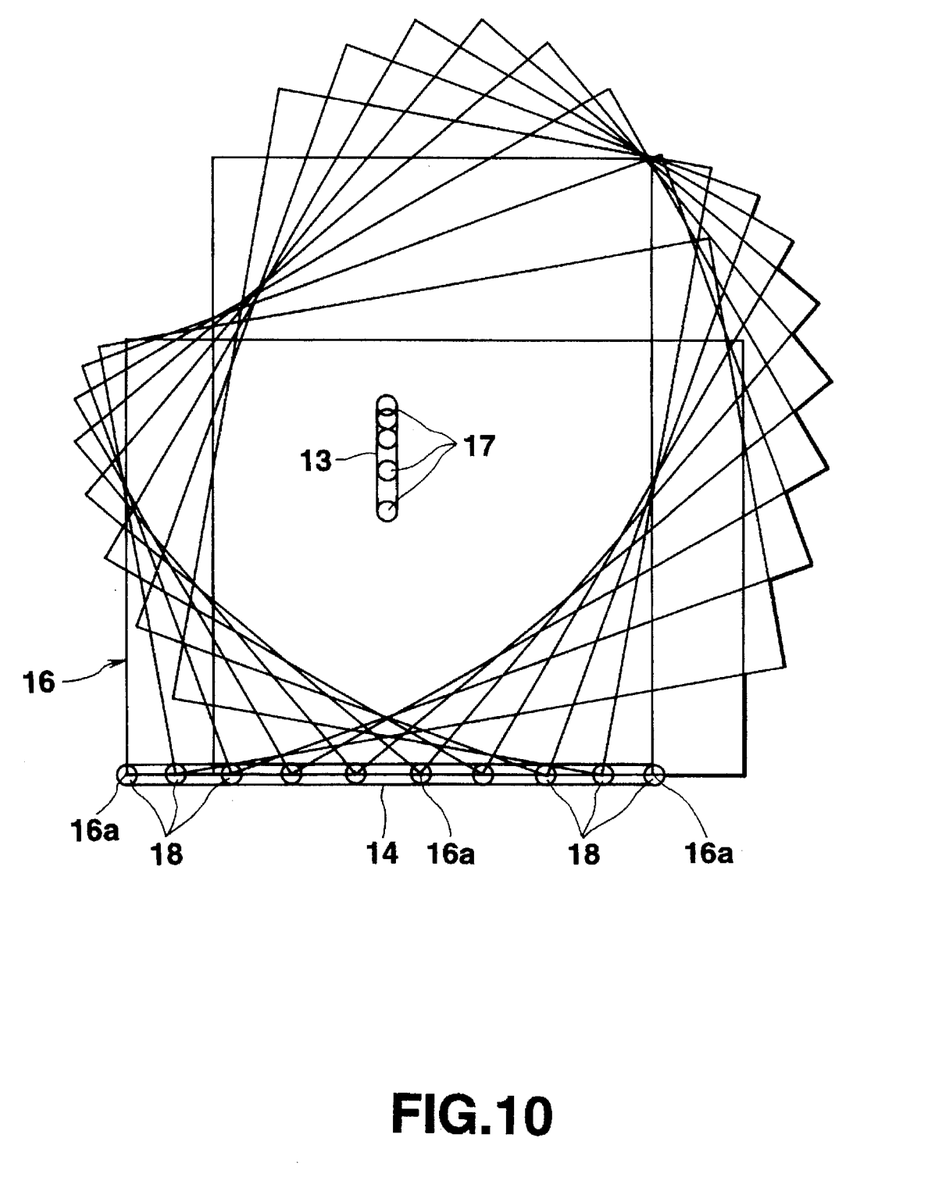
FIG. 10 shows a mount position of a second connecting member according to a second embodiment of the present invention and a moving track that the display case draws according to such an embodiment.
Figure 11:
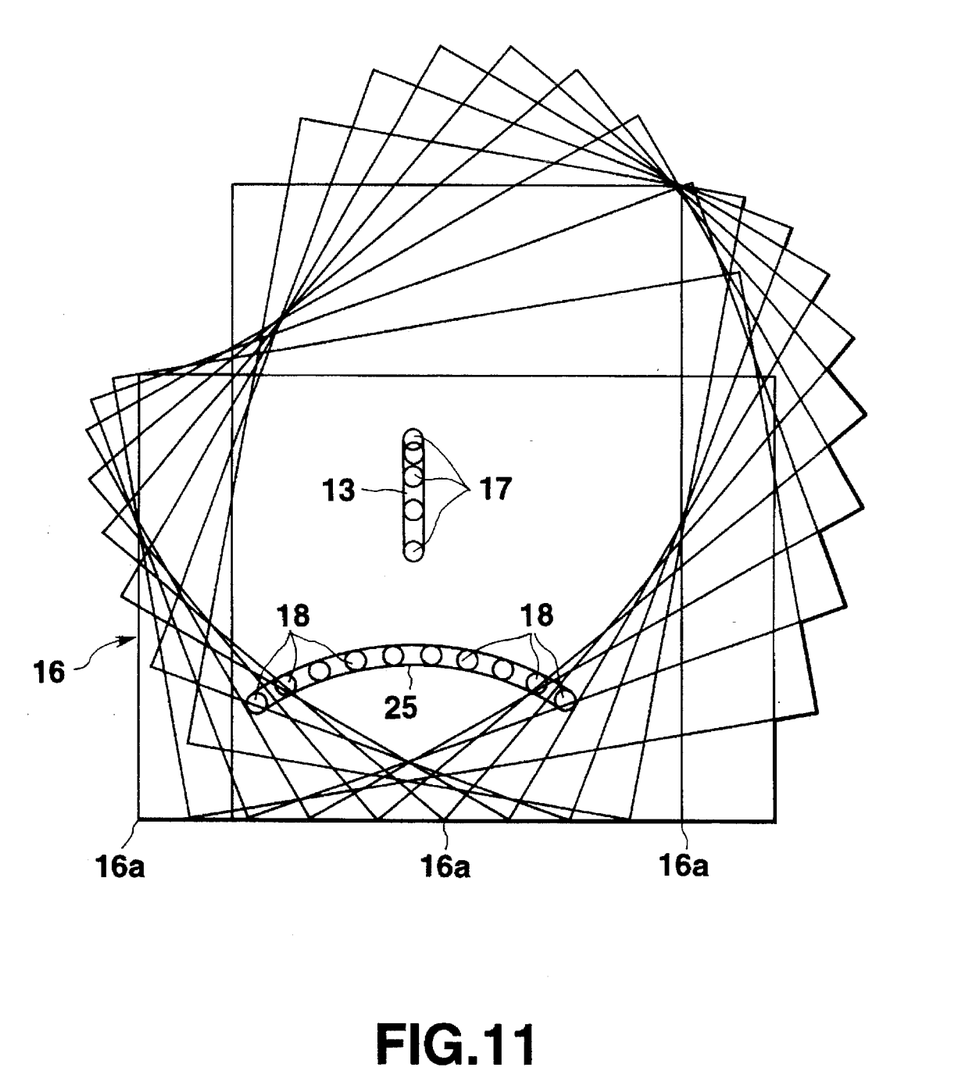
FIG. 11 shows a shape of a second guide groove according to a third embodiment of the present invention and a moving track that the display case draws according to such embodiment.

Although in the above-described first embodiment the second connecting member 18 is positioned between the first connecting member 17 and the lower left corner of the rear case 16 and the second guide groove 14 is formed, parallel to the hinge shaft in the attaching plate 12 of the support unit 5, these elements in the above-described first embodiment, they may also be arranged as shown in FIGS. 10 and 11.

In a second embodiment as shown in FIG. 10, the second connecting member 18 is positioned at the lower left corner 16a of the rear case 16 when the rear case 16 is in the horizontal state. When the display case 7 is changed over from the horizontal state to the vertical state and vice versa, therefore, the lower left corner 16a of the rear case 16 moves in a straight line, as shown in FIG. 10, and does not project downward.

In a third embodiment as shown in FIG. 11, a second guide groove 25 formed in the attaching plate 12 of the support unit 5 is shaped like a curve, enabling the second connecting member 18 to come nearer to the first guide groove 13 as it moves from either of both side ends of the groove 25 to the center thereof. When the display case 7 is changed over from the horizontal state to the vertical state and vice versa, therefore, the lower left corner 16a of the rear case 16 moves in a straight line, as in the case of the second embodiment. This prevents the corner 16a of the rear case 16 from being projected downward.

Although in the above described the first and second guide grooves 13 and 14 are formed in the attaching plate 12 of the support unit 5 while the first and second connecting members 17 and 18 are formed in the rear case 16 of the display case 7, these elements may be in the above-described embodiments, it may be arranged such that the first and second guide grooves 13 and 14 are formed in the rear case 16 of the display case 7 and the holes 22 and 23 through which the first and second connecting members 17 and 18 are passed are formed in the attaching plate 12 of the support unit 5. Advantageous effects similar to those described above can also be attained by such an alternate configuration.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A mechanism for swinging a rectangular plate-like panel unit between a first state in which the panel unit is set with its longer sides parallel to a horizontal direction and a second state in which the panel unit is set with its shorter sides parallel to the horizontal direction, said mechanism comprising:

a support unit swingably supporting the panel unit;

a first connecting member coupling the panel unit and the support unit, said first connecting member comprising a shaft around which the panel unit is swingable relative to the support unit;

a second connecting member coupling the panel unit and the support unit;

a first guide groove formed in the support unit to regulate movement of the first connecting member, said first connecting member engaging the first guide groove and being movable therein when the panel unit is swung between the first and second states; and a second guide groove formed in the support unit to regulate movement of the second connecting member, said second connecting member engaging the second guide groove and being movable therein when the panel unit is swung between the first and second states.

2. The panel unit swing mechanism according to claim 1, wherein the first connecting member is coupled to the panel unit at a substantially central portion of the panel unit, and the second connecting member is coupled to the panel unit at a position between the substantially central portion of the panel unit and a corner of the panel unit.

3. The panel unit swing mechanism according to claim 2, wherein the second connecting member is coupled to the panel unit between the substantially central portion of the panel unit and a lower left corner of the panel unit.

4. The panel unit swing mechanism according to claim 2, wherein the first guide groove extends in a substantially vertical direction within the support unit, and the second guide groove substantially extends in the horizontal direction within the support unit, said first connecting member moving up and down within the first guide groove and the second connecting member moving substantially horizontally within the second guide groove when the panel unit is swung between the first and second states.

5. The panel unit swing mechanism according to claim 1, wherein the first guide groove extends in a first direction within the support unit, and the second guide groove extends in a second direction within the support unit, said second direction being substantially perpendicular to the first direction.

6. The panel unit swing mechanism according to claim 5, wherein the second guide groove extends in a substantially straight line in the horizontal direction.

7. The panel unit swing mechanism according to claim 5, wherein the second guide groove extends in an arc curved toward the first guide groove.

8. The panel unit swing mechanism according to claim 1, wherein the first guide groove and the second guide groove are dimensioned such that the first connecting member and the second connecting member are respectively movable therein to rotate the panel unit 90 degrees between the first and second states.

9. The panel unit swing mechanism according to claim 1, wherein the first guide groove and the second guide groove are dimensioned such that a lower corner of the panel unit moves across the support unit in a substantially straight horizontal line when the panel unit is swung between the first and second states.

10. The panel unit swing mechanism according to claim 1, wherein the panel unit comprises a panel display.

11. A panel unit swing mechanism for use with a personal information device, said personal information device having a body which includes a key input section and a panel unit, said panel unit comprising a display section opposed to the key input section and said panel unit being movable between a first state in which the panel unit is set with its longer sides parallel to a horizontal direction and a second state in which the panel unit is set with its shorter sides parallel to the horizontal direction, said panel unit swing mechanism comprising:

a support unit swingably coupled to the body of the personal information device by hinges, said support unit swingably supporting the panel unit;

a first connecting member coupling the panel unit and the support unit, said first connecting member comprising a shaft around which the panel unit is swingable relative to the support unit;

a second connecting member coupling the panel unit and the support unit;

a first guide groove formed in the support unit to regulate movement of the first connecting member, said first connecting member engaging the first guide groove and being movable therein when the panel unit is swung between the first and second states; and a second guide groove formed in the support unit to regulate movement of the second connecting member, said second connecting member engaging the second guide groove and being movable therein when the panel unit is swung between the first and second states.

12. The panel unit swing mechanism according to claim 11, wherein the first connecting member is coupled to the panel unit at a substantially central portion of the panel unit, and the second connecting member is coupled to the panel unit at a position between the substantially central portion of the panel unit and a corner of the panel unit.

13. The panel unit swing mechanism according to claim 12, wherein the second connecting member is coupled to the panel unit between the substantially central portion of the panel unit and a lower left corner of the panel unit.

14. The panel unit swing mechanism according to claim 12, wherein the first guide groove extends in a substantially vertical direction within the support unit, and the second guide groove substantially extends in the horizontal direction within the support unit, said first connecting member moving up and down within the first guide groove and the second connecting member moving substantially horizontally within the second guide groove when the panel unit is swung between the first and second states.

15. The panel unit swing mechanism according to claim 11, wherein the first guide groove extends in a first direction within the support unit, and the second guide groove extends in a second direction within the support unit, said second direction being substantially perpendicular to the first direction.

16. The panel unit swing mechanism according to claim 15, wherein the second guide groove extends in a substantially straight line in the horizontal direction.

17. The panel unit swing mechanism according to claim 15, wherein the second guide groove extends in an arc curved toward the first guide groove.

18. The panel unit swing mechanism according to claim 11, wherein the first guide groove and the second guide groove are dimensioned such that the first connecting member and the second connecting member are respectively movable therein to rotate the panel unit 90 degrees between the first and second states.

19. The panel unit swing mechanism according to claim 11, wherein the first guide groove and the second guide groove are dimensioned such that a lower corner of the panel unit moves across the support unit in a substantially straight horizontal line when the panel unit is swung between the first and second states.

20. A panel unit swing mechanism for use with a personal information device, said personal information device having a body which includes a key input section and a panel unit, said panel unit comprising a display section opposed to the key input section and said panel unit being movable between a first state in which the panel unit is set with its longer sides parallel to a horizontal direction and a second state in which the panel unit is set with its longer sides parallel to a vertical direction, said panel unit swing mechanism comprising:

a support unit swingably coupled to the body of the personal information device by hinges, said support unit swingably supporting the panel unit;

a first guide groove formed in the support unit substantially extending in the vertical direction;

a second guide groove formed in the support unit substantially extending in the horizontal direction;

a first connecting member coupling the panel unit and the support unit, said first connecting member being coupled to a substantially central portion of the panel unit and comprising a shaft around which the panel unit is swingable relative to the support unit; and a second connecting member coupling the panel unit and the support unit, said second connecting member being coupled to the panel unit at a position between the substantially central portion of the panel unit and a corner of the panel unit;

wherein when the display unit is swung relative to the support unit between the first and second states, the first connecting member is guided by the first guide groove to move substantially in the horizontal direction and the second connecting member is guided by the second guide groove to move substantially in the vertical direction.

* * * * *